Patented Sept. 13, 1932

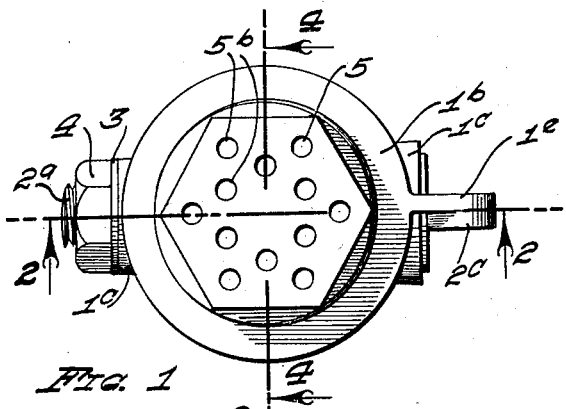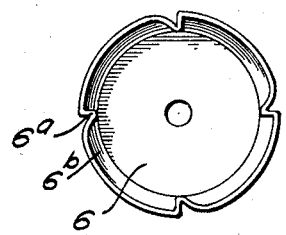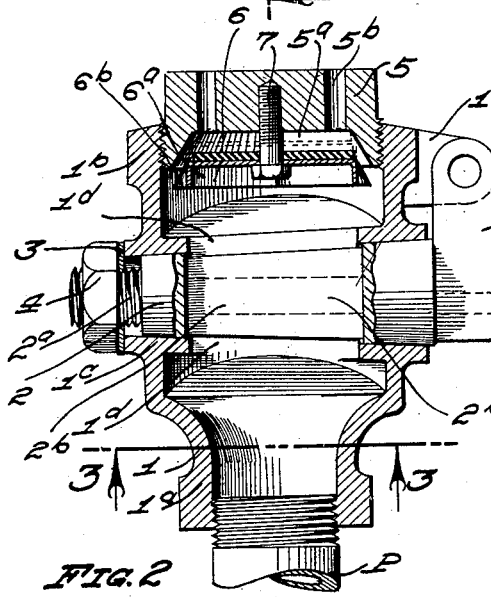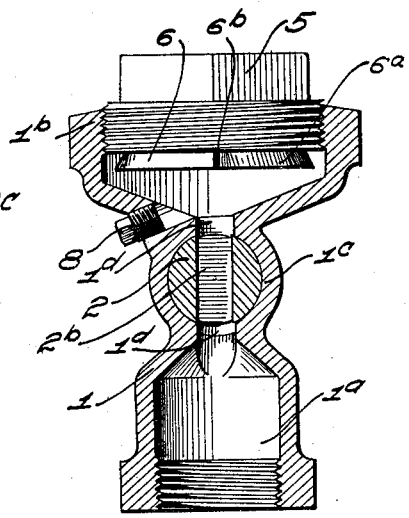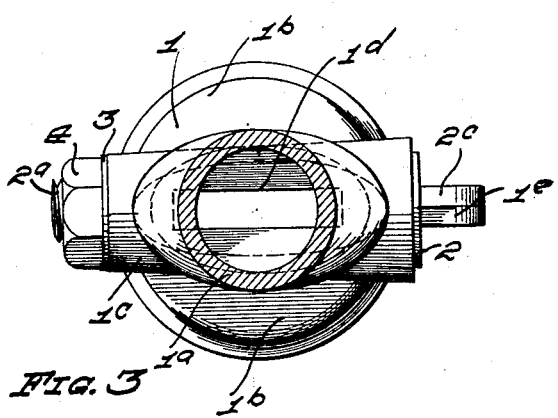
INVENTOR.
JOHN C. HIGGINS
BY A. B. Bowman
ATTORNEY

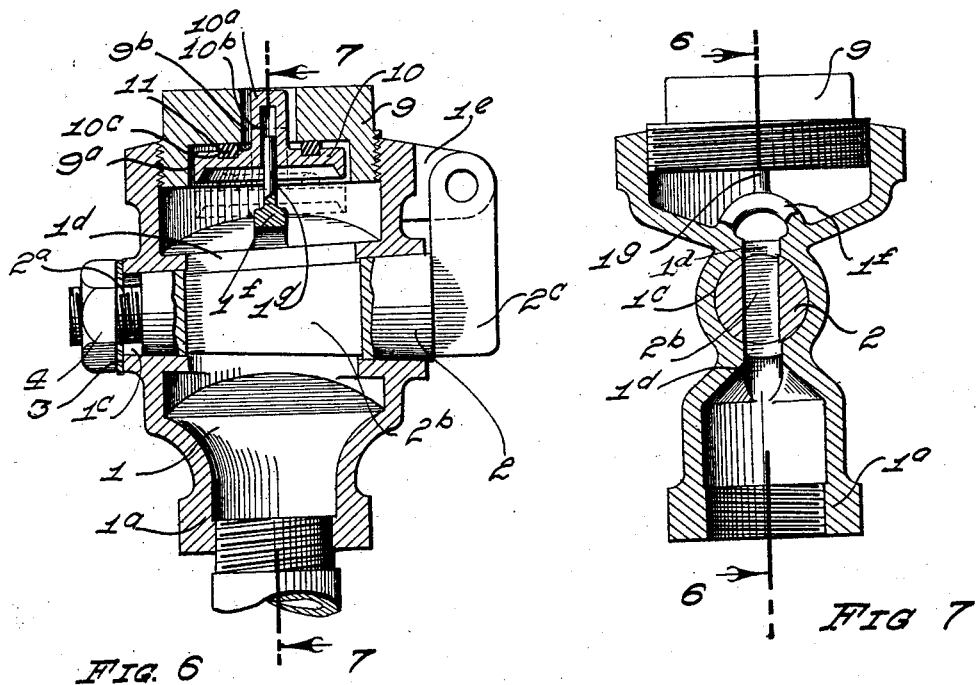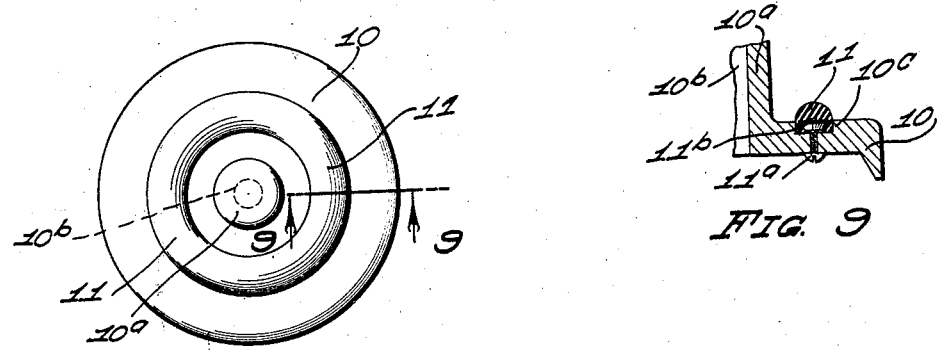

1,877,400

UNITED STATES PATENT OFFICE

JOHN C. HIGGINS, OF SAN DIEGO, CALIFORNIA

AIR RELIEF VALVE FOR PIPE LINES

Application filed March 19, 1928. Serial No. 262,678.

This invention relates to air relief valve apparatus for pipe lines and the objects of my invention are: First, to provide a valve apparatus of this class which permits air to enter a pipe line when said pipe line is being drained, thereby preventing the formation of a vacuum therein and the consequent collapsing of said pipe line; second, to provide a valve apparatus of this class which permits a maximum flow of water when draining a pipe line due to the fact that no vacuum is created in the pipe line which would tend to hold back the flow of water; third, to provide a valve apparatus of this class which permits air to escape from a pipe line when it is being filled with liquid, thereby preventing undue strain upon the pump or other means used to force the liquid into the pipe line; fourth, to provide a valve apparatus of this class which automatically closes when the pipe line becomes filled; fifth, to provide a valve apparatus of this class which permits the passage of gas therethrough but prevents the passage of liquid therethrough; sixth, to provide a valve apparatus of this class in which a valve head turns slightly with each operation, thus distributing the wear thereon, thereby eliminating the need of frequent repairing; seventh, to provide a valve apparatus of this class in which a stop cock is used in connection with said valve apparatus for permitting the repairing or adjusting of the valve apparatus when the pipe line is in use; eighth, to provide a valve apparatus of this class which may be positioned at suitable intervals along a pipe line depending upon the size of openings in said valve apparatus for the passage of air and the size of said pipe line; ninth, to provide a valve apparatus of this class which may be locked between its operations thus preventing tampering therewith; tenth, to provide a valve apparatus of this class which is extremely simple of construction proportionate to its functions, durable, easily installed, cheap of manufacture and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top or plan view of one form of my air relief valve apparatus; Fig. 2 is a longitudinal sectional view thereof through 2—2 of Fig. 1 with parts and portions shown in elevation to facilitate the illustration; Fig. 3 is a sectional view thereof through 3—3 of Fig. 2; Fig. 4 is a longitudinal sectional view thereof through 4—4 of Fig. 1 and Fig. 5 is a bottom view of the valve head used in connection with my air relief valve apparatus. Figs. 6 to 9 inclusive illustrate a slightly modified form of my air relief valve of which: Fig. 6 is a longitudinal sectional view through 6—6 of Fig. 7; Fig. 7 is a longitudinal view through 7—7 of Fig. 6; Fig. 8 is an enlarged plan view of the valve plunger, and Fig. 9 is a fragmentary sectional view through 9—9 of Fig. 8.

Similar characters of reference refer to similar parts and portions throughout the several views of the drawings.

The housing 1, stop cock 2, washer 3, bolt 4, valve cap 5, valve head 6, valve spring support 7 and drain plug 8, constitute the principal parts and portions of one form of my air relief valve apparatus, and valve plug 9, valve plunger 10 and gasket 11 constitute the principal parts and portions of a slightly modified form of my air relief valve apparatus.

In the one form of my valve apparatus shown in Figs. 1 to 5 inclusive, the housing 1 is provided with substantially cylindrical ends $1a$ and $1b$ which merge into a transversely extending, slightly conical passage $1c$. A slot $1d$ communicates between the ends $1a$ and $1b$ of the housing through the walls of the passage $1c$. The end $1a$ of the housing 1 is adapted to connect to any suitable pipe P as shown in Fig. 2 of the drawings. A tapered stop cock 2 is provided with an extended threaded portion $2a$ which projects beyond the smallest terminus of the tapered passage 1c. The extended portion 2a is threaded for receiving a bolt 4 and a washer 3. The stop cock is provided with a slot 2b which is adapted to aline with the slots 1d when the stop cock is in the position shown by solid lines in Fig. 2 of the drawings. A handle portion 2c extends from and to one side of the larger end of the stock cock 2. The handle 2c is adapted to engage an ear 1e of the housing 1 which extends outwardly from the end 1b thereof. Alined holes are provided in the handle 2c and the ear 1e which are adapted to receive a conventional padlock, not shown. The end 1b of the housing 1 is adapted to receive a cap 5 which is provided in its lower side with a cylindrical recess portion 5a having tapered side walls. Said recess portion forms a valve seat for a valve head 6. A plurality of openings 5b extend through the cap 5 and into the recess portion 5a. A valve head support 7 depends from the central portion of the recess 5a and is provided with an enlarged lower end 7a. A valve head 6 having substantially the shape of the recess portion 5a is slidably mounted on the valve head support 7, as shown best in Fig. 2 of the drawings. The valve head 6 is provided with tapered sides 6a which are crimped at intervals forming rudimentary vanes 6b. The upper face of the valve head 6 is covered with suitable pliable material which when in the position shown by dotted lines in Fig. 2 of the drawings, seals the opening 5b. A drain plug 8 is provided which fits into an opening provided in the lower side wall of the end 1b as shown in Fig. 4 of the drawings.

In the modified form of my air relief valve the housing 1, stop cock 2, washer 3, bolt 4, are identical with the first described structure except that a bridge portion 1f is provided which spans the central portion of the upper side of the slot 1d, as shown in Figs. 6 and 7 of the drawings. A spindle 1g extends upward and is preferably in a centered position relative to the upper opening 1b of the housing 1. A valve plug 9 fits in the upper opening 1b and is provided with a circular depressed portion 9a in the under side thereof which forms a valve seat. Centered relative to the recessed portion 9a is a passage 9b. A circular valve plunger 10 is provided which is adapted to fit loosely in the recess portion 9a. Centered on the valve plunger 10 and extending from the upper surface thereof, is a boss portion 10a. The boss portion extends into the passage 9b making a loose fit therewith. A socket portion 10b extends part way into the boss portion 10a from the lower side thereof and loosely receives the end of the spindle 1g. An annular channel 10c for receiving an annular gasket 11 is formed in the upper surface of the valve plunger 10. The gasket 11 is preferably formed of relatively soft rubber and is held in the channel by means of screws 11a which engage nuts 11b embedded in the gasket.

The operation of my valve apparatus is as follows:

When desiring to drain or fill a pipe line having a plurality of my devices positioned at intervals therealong, the stop cock of each valve is in the position shown by the solid lines in Fig. 2 of the drawings. If the pipe line is to be drained, the pressure of liquid holds the valve head 6 in the position shown by the dotted lines thereof in Fig. 2 of the drawings. As the water is drained out of the pipe and the pressure against the valve head 6 is released, it assumes the position shown by the solid lines shown in Fig. 2 of the drawings. When in this position air is permitted to pass through the opening 5b into the pipe line. When it is desired to fill the pipe line the action is reversed. Air is permitted to pass out the openings 5b until the water has reached the level of the valve apparatus. The water pressure then forces the valve head 6 into the valve seat 5a thereby closing the openings 5b. After the pipe is filled, the stop cock is then locked in position, as shown by solid lines in Fig. 2 of the drawings. The stop cock permits the removal of the valve head and cap for repairing or adjustment.

It will be noted that the rudimentary vanes 6b tend to give a slight twist to the valve head 6 as it moves to its closed position thus preventing the valve head from seating itself in the same position each time, thereby greatly reducing the wear thereon.

In the modification shown in Figs. 6 to 9 inclusive, the valve plunger is held in the position shown by solid lines in Fig. 6 of the drawings, when there is fluid pressure within the pipe line. When the pressure within the pipe line is released the valve plunger drops to the position shown by dotted lines in Fig. 6 of the drawings and permits air to pass in. Should the gasket 11 tend to stick due to long disuse, a slight blow on the top of the boss portion 10a is sufficient to loosen it.

It is obvious from the construction as illustrated in the drawings and described in the foregoing specification that there is provided an air relief valve apparatus as aimed at and set forth in the objects of my invention and though I have shown and described a particular construction, combination and arrangement of parts and portions, I do not wish to be limited to this particular construction, combination and arrangement of parts and portions but desire to include in the scope of my invention the construction, combination and arrangement substantially as set forth in the appended claims.

Having thus described my invention, what I claim as new and desire to secure by Letters Patent is:

1. In a valve apparatus of the class described, a housing, including upper, central and lower portions, a stop cock mounted within said central portion adapted to disconnect said upper and lower portions, means for coupling the lower end of said housing to a conventional water pipe line, a cap secured to the upper end of said housing, said cap being provided with openings therein, a valve seat integral with said cap, a valve head support forming a stem rigidly secured to the inner side of said cap, and a valve head reciprocally mounted on said stem adapted to permit the escape of gas and to close when under normal water pressure.

2. In a valve apparatus of the class described, a housing, means for coupling one end of said housing to a conventional water pipe line, a cap secured to the other end of said housing, said cap being provided with openings therein, a valve seat integral with said cap, a valve head support forming a stem secured to the inner side of said cap, a valve head mounted on said stem adapted to permit the escape of air from the line and to close when under normal water pressure, and a stop cock mounted intermediate the ends of said housing, for enabling said cap to be disconnected from said pipe line.

3. In a valve apparatus of the class described, an open-ended housing, means for coupling one end of said housing to a conventional water pipe line, a cap mounted in the other end of said housing, a depressed valve seat extending into said cap and provided with openings extending through said cap, a valve head positioned wholly within said housing and cap for closing the openings in said valve seat and supported in freely movable relation thereto, said valve head being adapted to permit the escape of air from said line and to close when under normal water pressure, and a stop cock mounted intermediate the ends of said housing, for enabling said cap to be disconnected from said line.

4. In a valve apparatus of the class described, a housing, means for coupling one end of said housing to a conventional water pipe line, a cap secured to the other end of said housing, said cap being provided with openings therein, a valve seat integral with said cap, a valve head support extending axially with said cap within said housing, a valve head slidably mounted on said valve head support for permitting the passage of gas and preventing the passage of fluid, a stop cock mounted intermediate the ends of said housing, and vane means formed in the periphery of said head for causing a slight turning of said valve head at each operation thereof.

5. In a valve apparatus of the class described, a housing, means for coupling one end of said housing to a conventional water pipe line, a cap mounted in the other end of said housing, a cylindrical recess extending into said cap on the inner side thereof forming a valve seating, openings extending through said cap from said seating for allowing the escape of air from said line, a valve head for closing the openings in said valve seat supported in freely movable relation thereto, and adapted to be closed by normal water pressure, a stop cock mounted intermediate the ends of said housing, and vane means in the periphery of said valve head adapted to cause slight rotational movement of said valve head when closing.

6. In an air relief valve for pipe lines, an auxiliary manually operated valve for closing the passage to said air relief valve between the operations thereof, means engageable by a padlock for locking said auxiliary valve in open position, a cap for said air relief valve mounted in one end thereof, a recessed valve seat portion extending into the inner side of said cap provided with openings extending through said cap, a valve head support depending from said valve seat, and a valve head slidably mounted on said support and actuated by liquid pressure for closing said openings in said valve seat.

7. In an air relief valve for pipe lines, an auxiliary manually operated valve for closing the passage to said air relief valve between the operations thereof, means engageable by a padlock for locking said auxiliary valve in open position, a cap for said air relief valve mounted in one end thereof, a recessed valve seat portion extending into the inner side of said cap provided with openings extending through said cap, a valve head support depending from said valve seat, a valve head slidably mounted on said support and actuated by liquid pressure for closing said openings in said valve seat, and vane means for turning said valve head at each operation thereof, said vane means being integral with said valve head.

In testimony whereof, I have hereunto set my hand at San Diego, California, this 8th day of March, 1928.

JOHN C. HIGGINS.